US011297595B2

United States Patent
Frydman et al.

(10) Patent No.: US 11,297,595 B2
(45) Date of Patent: Apr. 5, 2022

(54) METHODS CIRCUITS DEVICES SYSTEMS AND FUNCTIONALLY ASSOCIATED COMPUTER EXECUTABLE CODE FOR PAGING USER EQUIPMENT (UE) CONNECTED TO AN ENTERPRISE NETWORK

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: Saguna Networks Ltd., Yokneam Illit (IL)

( * ) Notice: Subject to any disclaimer, the term of this patent is extended or adjusted under 35 U.S.C. 154(b) by 0 days.

(21) Appl. No.: 16/281,408

(22) Filed: Feb. 21, 2019

(65) Prior Publication Data
US 2019/0289569 A1    Sep. 19, 2019

Related U.S. Application Data

(60) Provisional application No. 62/633,100, filed on Feb. 21, 2018.

(51) Int. Cl.
*H04W 68/00* (2009.01)
*H04W 76/28* (2018.01)
*H04L 29/08* (2006.01)
*H04L 67/10* (2022.01)

(52) U.S. Cl.
CPC ......... *H04W 68/005* (2013.01); *H04W 68/00* (2013.01); *H04W 76/28* (2018.02); *H04L 67/10* (2013.01)

(58) Field of Classification Search
CPC ... H04W 68/005; H04W 76/28; H04W 68/00; H04W 8/18; H04W 12/06; H04W 8/26; H04W 4/70; H04W 60/04; H04L 67/10
See application file for complete search history.

(56) References Cited

U.S. PATENT DOCUMENTS

| | | | | |
|---|---|---|---|---|
| 2012/0252517 A1* | 10/2012 | Karampatsis | ......... | H04W 60/04 455/515 |
| 2014/0349611 A1* | 11/2014 | Kant | ....................... | H04W 8/18 455/411 |
| 2016/0112847 A1* | 4/2016 | Hyytiainen | ............. | H04W 4/12 455/458 |

FOREIGN PATENT DOCUMENTS

EP    3429264 A1 *   1/2019   ............ H04W 28/06

* cited by examiner

*Primary Examiner* — Chi H Pham
*Assistant Examiner* — Ji-Hae Yea
(74) *Attorney, Agent, or Firm* — Insigne PC

(57) ABSTRACT

The present patent application relates to wireless communication networks which may include a radio access network segment functionally associated with an edge computing cloud. Server application may provide digital service to one or more mobile communication devices communicatively coupled to the radio access network segment. A network core including network management appliances and a mobile communication device paging message generator may be a part of the communication network. A networked paging trigger appliance may generate a mobile communication device specific paging trigger, configured to cause the paging message generator to page the specific mobile communication device.

10 Claims, 3 Drawing Sheets

METHODS CIRCUITS DEVICES SYSTEMS AND FUNCTIONALLY ASSOCIATED COMPUTER EXECUTABLE CODE FOR PAGING USER EQUIPMENT (UE) CONNECTED TO AN ENTERPRISE NETWORK

FIELD OF THE INVENTION

The present invention generally relates to the field of wireless communication. More specifically, the present invention relates to methods, circuits, devices, assemblies and systems for facilitating wireless communications, for example by paging a mobile communication device which is connected to a radio access network associated with an enterprise network.

BACKGROUND

Edge Computing is a new concept in Software Defined Networking and Virtualization Technology which is revolutionizing the way communication networks are designed, implemented and operated. The concept focuses on moving computing power and storage to the edge of the network and connecting User Equipment (UE) to applications residing on these edge platformers or on enterprise networks, without the need to pass the data traffic through the network core. When considering applications for the enterprise market, or any application that may want to initiate sessions with UEs over a mobile network, implementing an edge computing or edge cloud solution may lead to various issues, including the issue paging of one or more UE which may be in idle mode. Several server applications running on the enterprise network, such as PBX, may require the application to initiate a session with the UE. In cases where the UE has entered DRX mode, or any type of IDLE mode that requires a paging message to "wake it up", this paging process is usually initiated by the S-GW which detects data to be sent to a UE which is in DRX/Idle mode and triggers the MME to send a Paging Message towards that specific UE. In the edge cloud scenario, wherein the application is connected to the UE via a local breakout without going through the network core, the MME will not generate such a message as the S-GW will not detect that traffic is being sent towards this UE.

The present invention relates to methods, devices systems and functionally associated computer executable code to cause the MME to generate a paging message towards a UE that is in DRX mode, following the initiation of a session toward it, from a local breakout application, without the need for the traffic of the session initiation to pass through the network core.

Illustration and description of various wireless communication network elements may be described in conjunction with the FIG. 2. The following is an explanation of various network terms and abbreviations.

System Architecture Evolution (SAE) is the core network architecture of 3GPP's LTE wireless communication standard.

SAE is the evolution of the GPRS Core Network, with some differences:
 simplified architecture
 all-IP Network (AIPN)
 support for higher throughput and lower latency radio access networks (RANs)
 support for, and mobility between, multiple heterogeneous access networks, including E-UTRA (LTE and LTE Advanced air interface), 3GPP legacy systems (for example GERAN or UTRAN, air interfaces of GPRS and UMTS respectively), but also non-3GPP systems (for example WiFi, WiMAX or cdma2000)

The SAE has a flat, all-IP architecture with separation of control plane and user plane traffic. The main component of the SAE architecture is the Evolved Packet Core (EPC), also known as SAE Core. The EPC serves as the equivalent of GPRS networks (via the Mobility Management Entity, Serving Gateway and PDN Gateway subcomponents). The constituents of an EPC are:

MME (Mobility Management Entity): The MME is the key control-node for the LTE access-network. It is responsible for idle mode UE (User Equipment) paging and tagging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

SGW (Serving Gateway): The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PGW). For idle state UEs, the SGW terminates the downlink data path and triggers paging when downlink data arrives for the UE. It manages and stores UE contexts, e.g. parameters of the IP bearer service, network internal routing information. It also performs replication of the user traffic in case of lawful interception.

PGW (PDN Gateway): The PDN Gateway provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening. Another key role of the PGW is to act as the anchor for mobility between 3GPP and non-3GPP technologies such as WiMAX and 3GPP2 (CDMA 1X and EvDO).

HSS (Home Subscriber Server): The HSS is a central database that contains user-related and subscription-related information. The functions of the HSS include functionalities such as mobility management, call and session establishment support, user authentication and access authorization. The HSS is based on pre-Rel-4 Home Location Register (HLR) and Authentication Center (AuC).

ANDSF (Access Network Discovery and Selection Function): The ANDSF provides information to the UE about connectivity to 3GPP and non-3GPP access networks (such as Wi-Fi). The purpose of the ANDSF is to assist the UE to discover the access networks in their vicinity and to provide rules (policies) to prioritize and manage connections to these networks.

ePDG (Evolved Packet Data Gateway): The main function of the ePDG is to secure the data transmission with a UE connected to the EPC over an untrusted non-3GPP access. For this purpose, the ePDG acts as a termination node of IPsec tunnels established with the UE.

Discontinuous reception (DRX) is a method used in mobile communication to conserve the battery of the mobile device. The mobile device and the network negotiate phases in which data transfer occurs. During other times the device turns its receiver off and enters a low power state.

This is usually a function designed into the protocol that allows this to happen—most notably how the transmission is structured—for example in slots with headers containing address details so that devices can listen to these headers in each slot to decide whether the transmission is relevant to them or not. In this case, the receiver only has to be active at the beginning of each slot to receive the header, conserving battery life.

Other techniques include polling, whereby the device is placed into standby for a given amount of time and then a beacon is sent by the access point or base station periodically which indicates if there is any waiting data for it. This is used in 802.11 wireless networks when compatible access cards and access points negotiate a power saving mode arrangement.

A hybrid of the above techniques could be used in reality.

The Serving Gateway is the main packet routing and forwarding node in EPC. It also plays the role of a mobility anchor in inter-eNB and inter-RAT handovers. Charging (based on Quality of Service for example) and packet marking are other functions within this node. The S-GW connects to the MME via S11 interface and to eNB via the S1-U interface. The interface between the S-GW and P-GW is 35/S8.

The purpose of a Radio Access Bearer (RAB) is to provide a connection segment using the WCDMA Radio Access Network (WCDMA RAN) for support of a UMTS bearer service. The WCDMA RAN can provide Radio Access Bearer connections with different characteristics in order to match requirements for different UMTS bearers:

- The conversational speech RAB is tailored to 12.2 kbit/s Adaptive Multi Rate (AMR) speech and will also be used to carry emergency calls.
- Video telephony and ftp services may be offered across the Conversational 64 kbit/s Circuit Switched (CS) RAB,
- The streaming 57.6 kbit/s is offered to support a specific modem.
- The new PS streaming 8/54 kbit/s RAB will be implemented on DCH. This streaming RAB will be supported only in combination with PS interactive 8/8 kbit/s RB, no standalone PS streaming RAB will be supported.
- The maximum data rate supported by the Interactive RAB (Packet Switched, PS) is 384 kbit/s in the downlink and 64 kbit/s in the uplink, making it ideal for email or web browsing.
- It is also possible to use the speech RAB together with the interactive RAB that is usually called a Mult RAB.

SUMMARY OF INVENTION

Embodiments of the present include methods, circuits, devices, systems and functionally associated computer executable code for paging User Equipment, such a mobile communication device, wirelessly connected to a radio access network segment of a mobile communication network connected to a private enterprise cloud. According to some embodiments, paging of User Equipment may include transmission of a "wake-up" packet from an MME of a mobile communication network to a given User Equipment in idle mode responsive to an attempt by an application running within the private enterprise cloud to initiate communication with the given User Equipment.

When a UE according to embodiments of the present invention enters an enterprise premises, it may be configured to run application which connect locally to the enterprise cloud over the mobile network, breaking out to the cloud via an edge cloud platform located at the Radio Access Network (RAN) segment of the mobile network. After some period of no activity on the UE (DRX timeout which is usually configured to 10 sec) the UE may enter DRX mode, after which applications running on the enterprise cloud attempting to initiate a session with this UE will not be able to do so, as long as the UE is in idle mode. A paging message indicating to the UE that data is being sent to it and that it needs to exit the DRX/IDLE mode needs to be generated towards the UE by the MME, but since the data is not coming through the core, the MME may not be aware that the enterprise cloud application is initiating this session—specifically because the traffic coming from the enterprise cloud isn't passing through the S-GW. Embodiments of the present invention generate and transmit a paging message to a given UE responsive to a detection of an enterprise cloud related application's attempts to engage in a session with the given UE.

According to some embodiments of the present invention, an agent application functionally associated with an edge cloud (e.g. TSA) may detect session initiation attempts by a private cloud related application with a UE in idle mode. The agent application may, response to the detection, signal an external server to initiate paging message generation to the UE in idle mode. The paging message itself may be generated by an Evolved Packet Core or of functionally associated MME of a communication network in accordance with embodiments of the present invention.

As seen in FIG. 1 below UEs can be locally connected to an enterprise network at the RAN segment of a mobile network. Embodiments of the present invention are in the field of breakout applications at the edge of mobile networks, in the cases where a user device (UE) is connected to an enterprise network, or any other relevant network, via a breakout at the mobile network Radio Access Network (RAN) segment. When the UE has entered DRX mode, or any other idle or similar mode (following no activity for a predefine period of time), it will not be able to receive any data sent to it. If data needs to be sent to this UE from a local breakout application, for example from a local PBX which initiates a call to the UE, the UE must move from DRX mode into active mode through a paging process. As the breakout application isn't connected to the UE via the S-GW of the mobile network, the S-SW isn't able to trigger the paging process towards the UE, as is done in mobile networks.

Embodiments of the present invention include a procedure to enable the generation of a paging message to a UE in DRX or any other IDLE mode, from an enterprise cloud application, in accordance to the following figure:

1. TCP Server App 'TSA' on Edge cloud listens on new RAB notifications

2. TSA opens a fixed connection with a "Remote Internet Server" RIS and sends it its ID code 3. When UE connects, the TSA detects a "New RAB" notification 4. TSA opens a connection with the RIS by sending a TCP Syn over the new RAB, using the UE IP address. This is a "Mid RAB Connection" MRC 5. TSA sends over the MRC its ID code to the RIS. Now the RIS holds the TSA ID code in relevance to both connections (fixed and TCP over RAB)

6. Enterprise App attempts to send a message to the UE, but the RAB is already closed as the UE entered a DRX/Idle mode (happens after ~10 sec of inactivity)

7. Edge cloud asks TSA to "wake up the device"

8. TSA sends a "wake up" TCP packet on the fixed connection to the RIS

9. RIS relays the TCP packets over the MRC to the target UE

10. EPC receives the packets and starts a "paging procedure" with the UE

11. After UE is out of DRX mode and the RAB is opened again, Edge cloud collects the "wakeup packet" and forwards it to TSA and reassigns the RAB 12. Edge cloud can forward the packet coming from the enterprise Local App to the target UE If UE moved away from the Edge cloud (handoff):

1. The "wake up" packet will be sent to the UE by the EPC. This will trigger a TCP reset on the connection closing the connection on the RIS, that will notify the TSA that the UE has moved away 2. This will result in the Edge cloud sending the Local ME enterprise an ICMP message "ICMP destination unreachable"

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
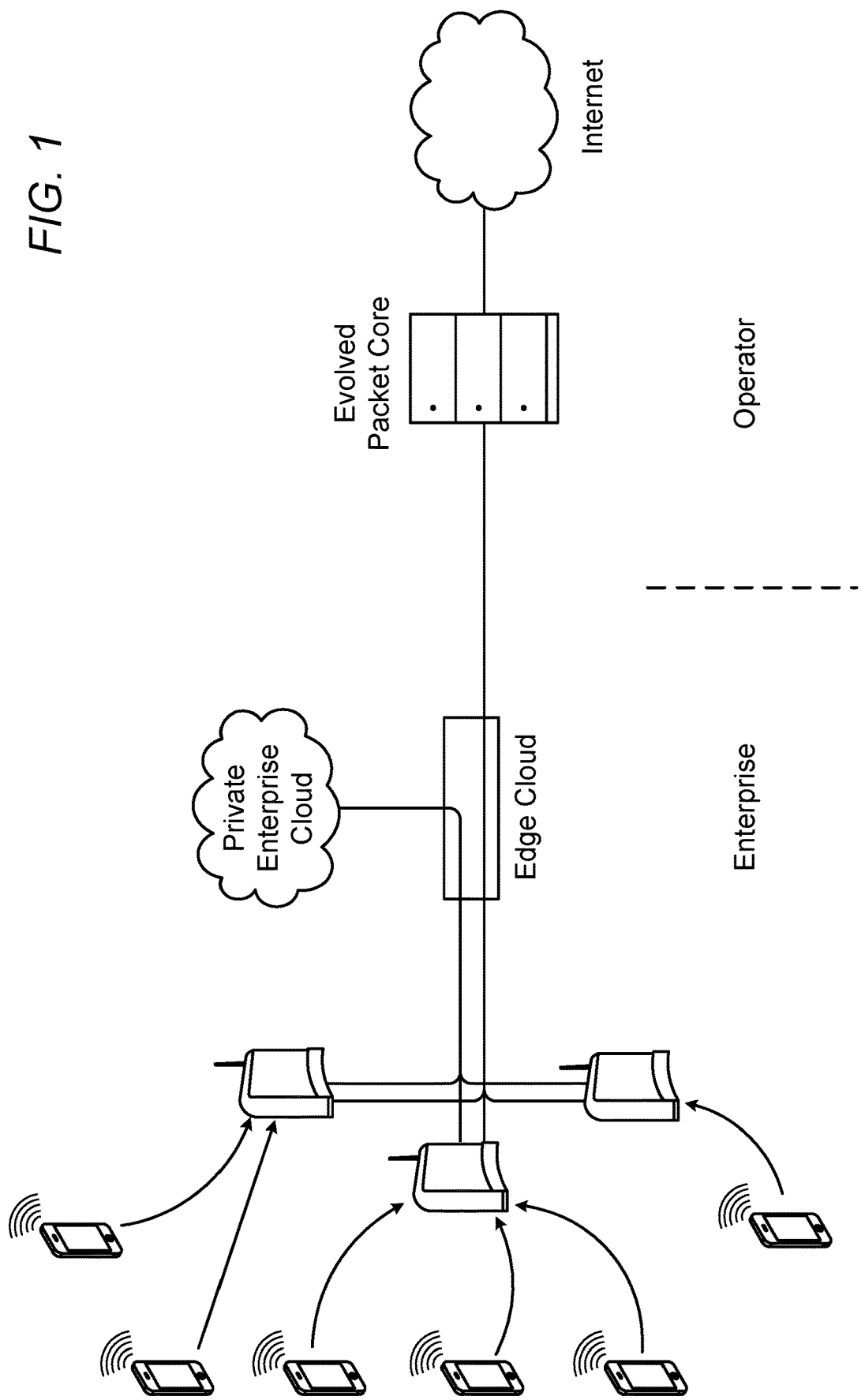
FIG. 1 is a network block diagram illustrating how one or more mobile communications devices (UE's) communicatively couple to radio access segment of a wireless communication network associated with an edge cloud which connects the UE's to a private enterprise cloud.
Figure 2:
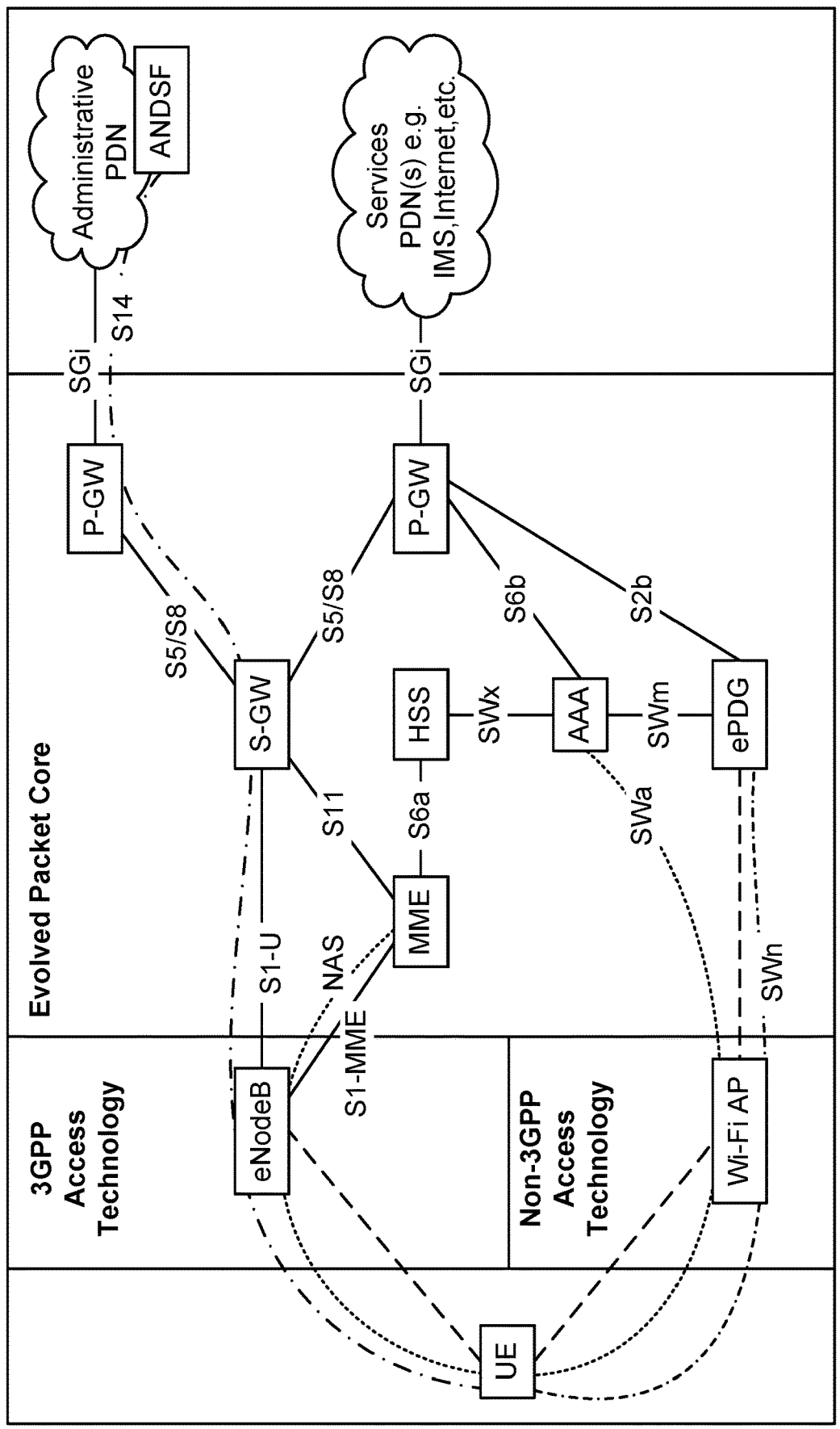
FIG. 2 is a functional block diagram of an evolved packet core used to explain network related terms introduced in the background of the present application.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting" "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

Embodiments of the present invention may include a wireless communication system comprising a wireless communication network comprising: (a) at least one radio access network segment functionally associated with an edge computing cloud through which a server application provides digital service to one or more mobile communication devices communicatively coupled to said radio access network segment; and (b) a network core including network management appliances and a mobile communication device paging message generator. Embodiments also include a networked paging trigger appliance adapted to generate a mobile communication device specific paging trigger, configured to cause said paging message generator to page the specific mobile communication device, responsive to receiving from the server application a notification that said server application is attempting to communicate with the specific mobile communication device.

According to some embodiments, a paging message generator may be a Mobility Management Entity (MME) of the said wireless communication network. The edge cloud may include an agent application (TSA) configured to detect communication attempts by the server application with the specific mobile communication device. The agent application may generate a notification to said networked paging trigger appliance. The mobile communication device specific paging trigger may be a data packet addressed to the public internet network address of the specific mobile communication device as issued by the wireless communication network when the paging trigger appliance is a server connected to the public internet and communicates with the wireless communication network through the public internet. The mobile communication device specific paging trigger may be a data packet addressed to the private network address of the specific mobile communication device as issued by the wireless communication network when the paging trigger appliance is a server connected to the core of the wireless communication network.

Figure 3:
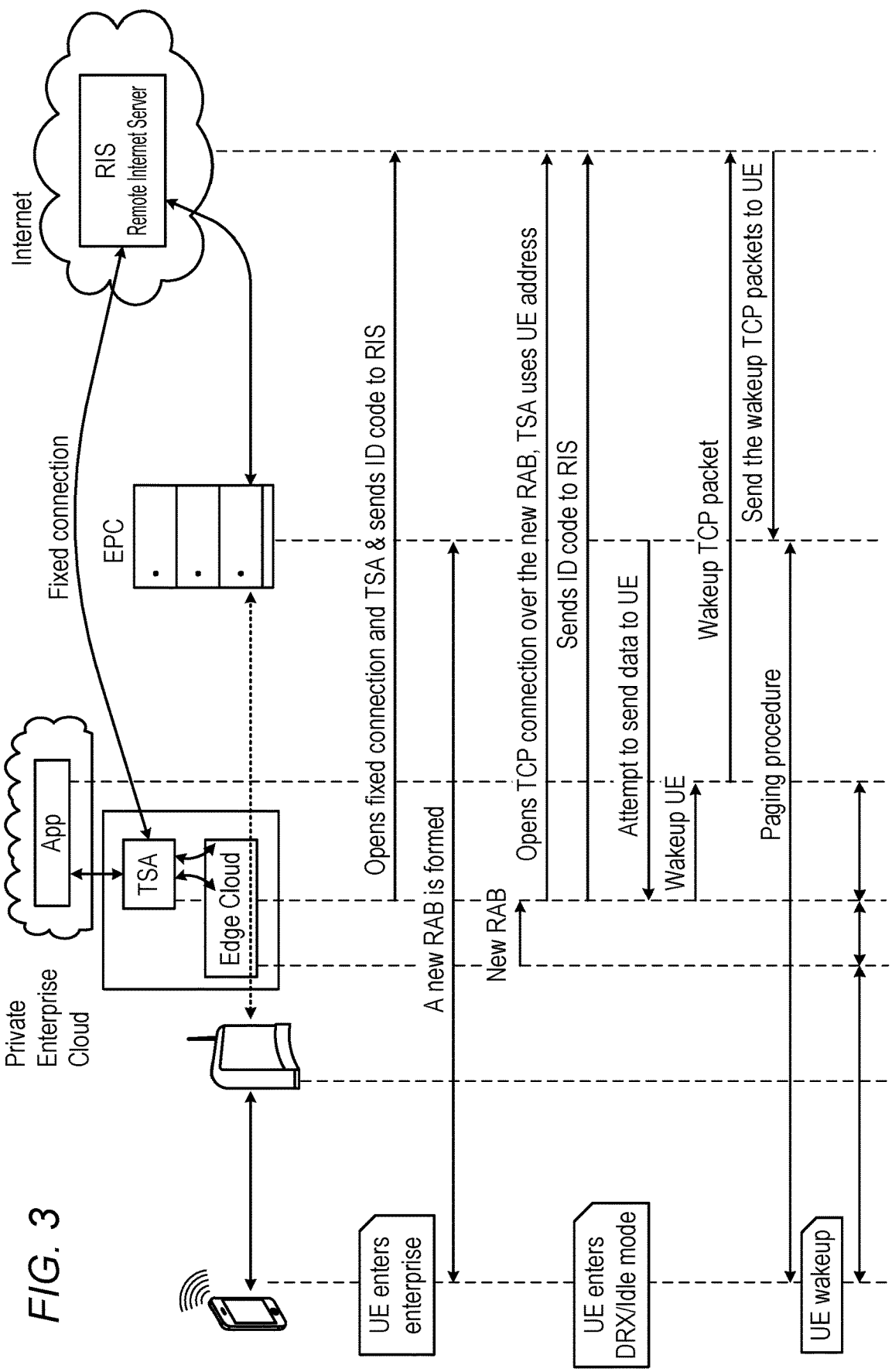
FIG. 3 is a hybrid network architecture and signaling flow diagram illustrating the network elements and communication signaling which provides paging in accordance with embodiments of the present invention.

According to some embodiments, the specific mobile communication device causes the device to exit an idle. The paging the specific mobile communication device may enable the server application to initiate a communication session with the specific mobile communication device, Turning now to FIG. 3, there is shown a hybrid network architecture and signaling flow diagram illustrating the network elements and communication signaling which provides paging in accordance with embodiments of the present invention. More specifically, FIG. 3 illustrates a procedure of generating a paging message to a UE in DRX or any other IDLE mode, from an enterprise cloud application, ad follows:

1. TCP Server App 'TSA' on Edge cloud listens on new RAB notifications
2. TSA opens a fixed connection with a "Remote Internet Server" RIS and sends it its ID code
3. When UE connects, the TSA detects a "New RAB" notification
4. TSA opens a connection with the RIS by sending a TCP Syn over the new RAB, using the UE IP address. This is a "Mid RAB Connection" MRC
5. TSA sends over the MRC its ID code to the RIS. Now the RIS holds the TSA ID code in relevance to both connections (fixed and TCP over RAB)
6. Enterprise App attempts to send a message to the UE, but the RAB is already closed as the UE entered a DRX/Idle mode (happens after ~10 sec of inactivity)
7. Edge cloud asks TSA to "wake up the device"
8. TSA sends a "wake up" TCP packet on the fixed connection to the RIS
9. RIS relays the TCP packets over the MRC to the target UE
10. EPC receives the packets and starts a "paging procedure" with the UE
11. After UE is out of DRX mode and the RAB is opened again, Edge cloud collects the "wakeup packet" and forwards it to TSA and reassigns the RAB
12. Edge cloud can forward the packet coming from the enterprise Local App to the target UE If UE moved away from the Edge cloud (handoff):
1. The "wake up" packet will be sent to the UE by the EPC. This will trigger a TCP reset on the connection closing the connection on the RIS, that will notify the TSA that the UE has moved away
2. This will result in the Edge cloud sending the Local ME enterprise an ICMP message "ICMP destination unreachable"

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless communication system comprising:
a wireless communication network comprising: (a) at least one radio access network segment functionally associated with an edge computing cloud through which a server application provides digital service to one or more mobile communication devices communicatively coupled to said radio access network segment; and (b) a network core including network management appliances and a mobile communication device paging message generator; and
a networked paging trigger appliance adapted to generate a mobile communication device specific paging trigger, configured to cause said paging message generator to page the specific mobile communication device, responsive to receiving from the server application a notification that said server application is attempting to communicate with the specific mobile communication device.

2. The wireless communication system according to claim 1, wherein said paging message generator is a Mobility Management Entity (MME) of the said wireless communication network.

3. The wireless communication system according to claim 1, wherein the edge cloud includes an agent application (TSA) configured to detect communication attempts by the server application with the specific mobile communication device.

4. The wireless communication system according to claim 3, wherein the agent application generates a notification to said networked paging trigger appliance.

5. The wireless communication system according to claim 1, wherein said mobile communication device specific paging trigger is a data packet addressed to a public internet network address of the specific mobile communication device as issued by the wireless communication network.

6. The wireless system communication system according to claim 5, wherein said paging trigger appliance is a server connected to an internet gateway and communicates with the wireless communication network by sending packets through the internet.

7. The wireless communication system according to claim 1, wherein said mobile communication device specific paging trigger is a data packet addressed to a private network address of the specific mobile communication device as issued by the wireless communication network.

8. The wireless system communication system according to claim 7, wherein said paging trigger appliance is a server connected to the core of the wireless communication network.

9. The wireless system according to claim 1, wherein paging the specific mobile communication device causes the device to exit an idle.

10. The wireless system according to claim 6, wherein paging the specific mobile communication device enables the server application to initiate a communication session with the specific mobile communication device.

* * * * *